United States Patent [19]

Thrasher

[11] Patent Number: 5,342,436
[45] Date of Patent: Aug. 30, 1994

[54] COMPOSITION FOR PROTECTING AND SEALING ARTICLES

[76] Inventor: John K. Thrasher, 2614 Hadley Rd., Camby, Ind. 46113

[21] Appl. No.: 29,703

[22] Filed: Mar. 11, 1993

[51] Int. Cl.$^5$ .................. C09G 1/08; C09D 101/28; C09D 191/06; C09D 191/08
[52] U.S. Cl. .................................. 106/10; 108/5; 108/8; 108/187; 108/188; 106/189; 106/191; 106/268; 106/271
[58] Field of Search ............ 106/3, 5, 8, 10, 187, 106/188, 189, 191, 243, 268, 271

[56] References Cited

U.S. PATENT DOCUMENTS

| | | | |
|---|---|---|---|
| 4,218,250 | 8/1980 | Kasprzak | 106/3 |
| 4,950,467 | 8/1990 | Phalangas et al. | 106/3 |
| 5,017,222 | 5/1991 | Cifuentes et al. | 106/3 |
| 5,092,922 | 3/1992 | Kuwata et al. | 106/3 |

Primary Examiner—David Brunsman

[57] ABSTRACT

A liquid phase composition for topical application to wood or other articles serves as a sealant and protective finish. The composition comprises paraffin wax dispersed in mineral oil and an extender, preferably, wood alcohol or ethanol, and optionally, relatively small amounts of additives including colorants, fragrance components, UV light absorbers, and so on. Thickeners and a solubilizing agent such as a volatile, low viscosity silicone may be added to produce a creamy form. The liquid composition is topically applied to wood or other articles by means of a fine wiping cloth or a fine bristle brush. Little or no buffing is required. Once applied, the composition imparts a non-greasy, rich luster to the surface of an article (e.g. wood furniture).

9 Claims, No Drawings

COMPOSITION FOR PROTECTING AND SEALING ARTICLES

BACKGROUND OF THE INVENTION

1. Field of the Invention

The present invention relates generally to compositions for protecting and sealing various articles such as wood furniture, for example.

2. Description of the Prior Art

Furniture wax compositions are quite well known. Generally such compositions comprise a wax component applied directly to a surface (e.g. a wood table top) followed by vigorous wiping or buffing. A need exists for a composition which may easily be applied to a surface, which does not require vigorous buffing, which imparts a protective and sealing finish to the surface, and which is relatively inexpensive to manufacture.

The foregoing need is met by the new and improved protecting and sealing composition of the present invention as will be made apparent from the following description thereof. Other advantages of the present invention over the prior art also will be rendered evident.

SUMMARY OF THE INVENTION

To achieve the foregoing and other advantages, the present invention, briefly described, provides a liquid phase composition for topical application to wood or other articles so as to serve as a sealant and protective finish. The composition comprises paraffin wax dispersed in mineral oil and an extender, preferably, wood alcohol or ethanol, and optionally, relatively small amounts of additives including colorants, fragrance components, UV light absorbers, and so on. Thickeners and a solubilizing agent such as a volatile, low viscosity silicone may be added to produce a creamy form. The liquid composition is topically applied to wood or other articles by means of a fine wiping cloth or a fine bristle brush. Little or no buffing is required. Once applied, the composition imparts a non-greasy, rich luster to the surface of an article (e.g. wood furniture).

The above brief description sets forth rather broadly the more important features of the present invention in order that the detailed description thereof that follows may be better understood, and in order that the present contributions to the art may be better appreciated. There are, of course, additional features of the invention that will be described hereinafter and will form the subject matter of the claims appended hereto.

In this respect, before explaining the preferred embodiments of the invention in detail, it is to be understood that the invention is not limited in its application to the details of the construction and to the arrangements of the components set forth in the following description. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved composition for sealing and protecting the surface of various articles and which has all of the advantages of the prior art and none of the disadvantages.

It is another object of the present invention to provide a new and improved composition for sealing and protecting the surface of various articles which may be efficiently manufactured and marketed.

An even further object of the present invention is to provide a new and improved composition for sealing and protecting the surface of various articles which is susceptible of a low cost of manufacture with regard to both materials and labor, and which accordingly is then susceptible of low prices of sale to the consuming public, thereby making such composition available to the buying public.

Still yet a further object of the present invention is to provide a new and improved composition for sealing and protecting the surface of various articles and which is adapted to be topically applied to such articles in a liquid, easily spreadable form.

It is still a further object of the present invention to provide a new and improved composition that may be topically applied to various articles to add a non-greasy, rich luster to same.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the following detailed description of the preferred embodiments of the invention.

DESCRIPTION OF THE PREFERRED EMBODIMENT

In general terms, the new and improved composition of the present invention comprises a paraffin wax oil dispersed in an extender and may include various additives to produce a liquid, easily applied and spreadable phase.

The paraffin wax oil component comprises paraffin wax dispersed in light mineral oil with the wax being present in the mineral oil in an mount by weight up to about 10%, with about 5% being mostly preferred. The paraffin wax off component then is dispersed in an extender with the paraffin wax oil component being present in an amount by weight up to about 40% and the remainder of the composition comprising the extender. Suitable extenders comprise ethanol, isopropyl alcohol, cetosteryl alcohol, and propylene glycol. A mostly preferred composition comprises a mixture of 30% percent paraffin wax oil (5%) and 70% ethanol by weight.

The foregoing liquid phase composition is easily be stored in a can or bottle and simply may be applied to the surface of an article being treated by pouring and then spreading with a lint-free cloth, fine bristle brush, sponge or the like. Little or no buffing is required. When so applied, the composition deposits a protective long wearing transparent film on the surface of the article, and if the article is porous, such as for example, wood, the liquid composition also functions as a sealant. Hence, the composition of the invention is ideally suited as a finish to be applied to wood furniture, cabinets, and so on. The composition of the invention removes dust, stains and grime and leaves a non-greasy, rich luster to the treated surface. The composition may also be applied to metallic articles as a cleaner and rust preventative.

In addition to those already described above, additional ingredients optionally may be added to the composition of the invention. For example, if a particular color is desired, a colorant miscible in the paraffin oil/extender mixture may be included generally in an amount not exceeding about 1.0% by weight. Similarly, if is desired to impart a distinctive odor to the composition, such fragrance components as lemon extract, or pine cone oil, for example, may be added generally in an amount up to about 0.5% by weight.

In an alternatively preferred composition according to the invention, a thickener and a solubilizing agent may be added to produce a composition in the form of creamy liquid or polish. Suitable thickening agents include talc, beeswax carnauba wax, silica gel, stearic acid, ethyl cellulose, or lanolin. Enough thickening agent is added to the composition to impart a desired creamy consistency. Generally the thickener should comprise no more than about 10% of the composition by weight to avoid excessive viscosity and difficulty in application.

The solubilizing agent should be compatible with the extender to form a stable composition. A suitable solubilizing agent comprises a volatile, low viscosity silicone selected from the group consisting of the polysiloxanes, and more specifically the cyclomethicones, either cyclomethicone pentamer or cyclomethicone tetramer. Generally, the solubilizing agent may comprise up to about 20% of the composition by weight.

Finally, ultraviolet absorbers or sunscreens may be added to the composition to further enhance its protective properties. Examples of ultraviolet absorbers which may be employed include octyl dimethyl PABA and benzophenone-3. The sunscreen component may comprise up to about 5% of the composition by weight.

The following Examples further illustrate the preferred embodiments of the invention, but are not to be construed as limiting.

EXAMPLE 1

The following ingredients were mixed together to form an example of the composition of the invention (all quantities are stated as weight percent):

| Paraffin wax oil (5%) | 30.00% |
| Ethanol | 70.00% |
| Total | 100.00% |

The resulting composition was stable in liquid form and was easily spreadable upon the surface of wood furniture by a sponge imparting a non-greasy, rich luster to the wood and leaving a transparent protective film.

EXAMPLE 2

The following ingredients were mixed together to form an example of the composition of the invention (all quantities are stated as weight percent):

| Paraffin wax oil (5%) | 27.00% |
| Ethanol | 48.00% |
| Cyclomethicone Tetramer | 20.00% |
| Ethyl Cellulose | 1.50% |
| Octyl Dimethyl PABA | 2.00% |
| Benzophenone-3 | 1.00% |
| Lemon extract | 0.50% |
| Total | 100.00% |

The resulting composition had a creamy consistency and a slight, pleasant lemony odor. It was readily applied to the surface of wood furniture by a cloth imparting a rich luster to the wood and leaving a transparent protective film.

While the present invention has been fully described above with particularity and detail in connection with what is presently deemed to be the most practical and preferred example(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications.

What is claimed as being new and desired to be protected by Letters Patent of the United States is as follows:

1. A new and improved composition useful as a protective sealant for articles comprising the following mixture:
   a paraffin wax dispersed in mineral oil to form a paraffin wax in oil dispersion, and
   an extender for said paraffin wax in mineral oil dispersion, said extender being selected from the group consisting of ethanol, isopropyl alcohol, cetosteryl alcohol, and propylene glycol.

2. The composition of claim 1 wherein said paraffin wax oil is present in said composition in an amount greater than zero and up to about 80% by weight, said extender comprising the remainder of the composition.

3. The composition of claim 1 wherein said paraffin wax oil is present in said composition in an amount greater than zero and up to about 70% by weight, said extender comprising the remainder of the composition.

4. The composition of claim 1 further comprising a thickening agent, and a solubilizing agent.

5. The composition of claim 4 wherein said thickening agent is selected from the group consisting of talc, beeswax carnauba wax, silica gel, stearic acid, ethyl cellulose, or lanolin, and said solubilizing agent is a volatile, silicone.

6. The composition of claim 5 wherein said silicone is selected from the group consisting of cyclomethicone pentamer or cyclomethicone tetramer.

7. The composition of claim 6 wherein said thickener comprises up to about 10% of said composition by weight and said silicone comprises an amount greater than zero and up to 20% of said composition by weight.

8. The composition of claim 7 comprising a mixture of the following ingredients:

| | |
|---|---|
| paraffin wax in mineral oil dispersion | 27.00% |
| Ethanol | 48.00% |
| Cyclomethicone Tetramer | 20.00% |
| Ethyl Cellulose | 1.50% |
| Octyl Dimethyl PABA | 2.00% |
| Benzophenone-3 | 1.00% |
| Lemon extract | 0.50% |
| Total | 100.00%. |

9. The composition of claim 7 comprising a mixture of the following ingredients: a paraffin wax in oil dispersion; ethanol; cyclomethicone tetramer; ethyl cellulose; octyl dimethyl PABA; benzophenone-3; and lemon extract.

* * * * *